United States Patent [19]

Baublitz, Sr.

[11] Patent Number: 5,529,272
[45] Date of Patent: Jun. 25, 1996

[54] PORTABLE ADJUSTABLE TRANSDUCER AND DEPTH-FINDER HOLDER

[76] Inventor: Harry C. Baublitz, Sr., Rte. 1, Box 320, Delmar, Del. 19940

[21] Appl. No.: 417,690

[22] Filed: Apr. 6, 1995

[51] Int. Cl.⁶ .................................................. F21L 15/08
[52] U.S. Cl. .................. 248/231.71; 248/285.1; 248/309.1
[58] Field of Search .................... 248/231.71, 283.1, 248/285.1, 229.25, 229.15, 309.1, 219.2

[56] References Cited

U.S. PATENT DOCUMENTS

| | | | |
|---|---|---|---|
| 5,016,225 | 5/1991 | Blomberg | 367/173 |
| 5,161,764 | 11/1992 | Roney | 248/231.71 |
| 5,174,533 | 12/1992 | Pryor et al. | 248/231.71 |

Primary Examiner—Leslie A. Braun
Assistant Examiner—Willie Berry, Jr.
Attorney, Agent, or Firm—Walter G. Finch; Nancy A. Smith

[57] ABSTRACT

This invention relates to a portable and adjustable means for holding a measuring device and its display unit, and more particularly to an apparatus for supporting a boat transducer and depth-finder display within one embodiment. The measuring device holder consists of a tube through which the measuring device lead passes, with the bottom of the tube indented to receive a measuring device bracket to which the measuring device is mounted. The tube hooks onto the upper ledge of the boat transom by means of a tube block consisting of a tightening screw on one side and a boat clamp on the other. The inner space of the boat clamp may be lined with foam or some other cushion. The tube has another tube block at its top with another tightening screw into which the base of the display holder fits, allowing it to be rotated 360° and/or locked into a rigid position. The display unit holder consists of a box with one open side into which the display unit is placed, with an opening in the bottom for battery leads to pass through. Beneath the box are attached extra support inserts.

12 Claims, 2 Drawing Sheets

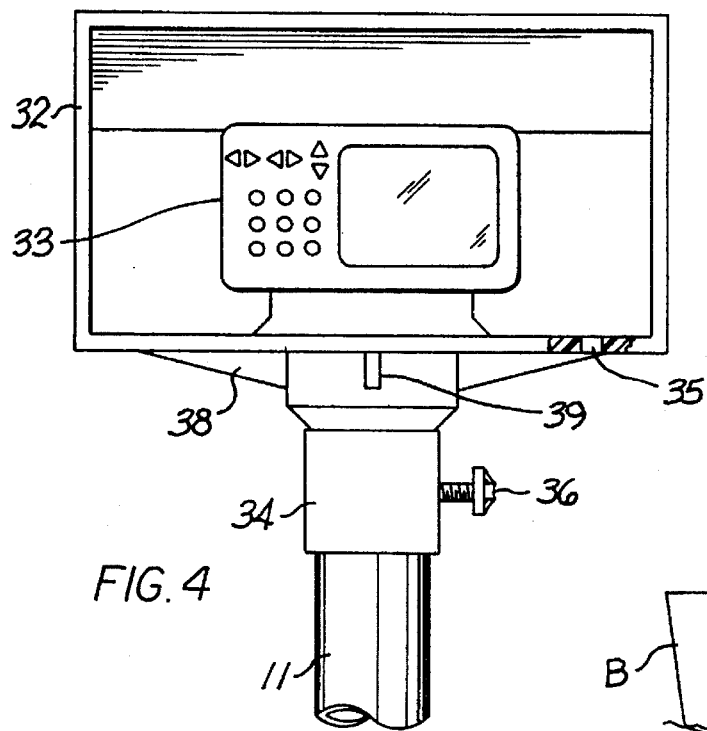
FIG. 4
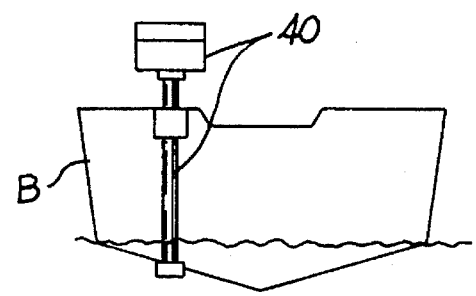
FIG. 6
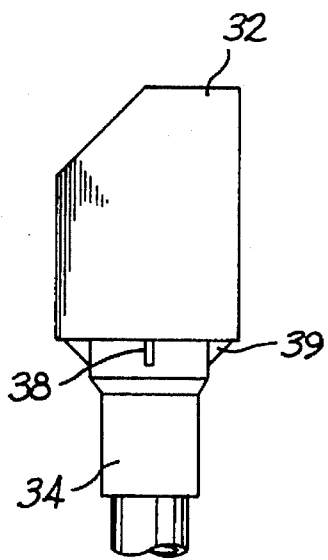
FIG. 5
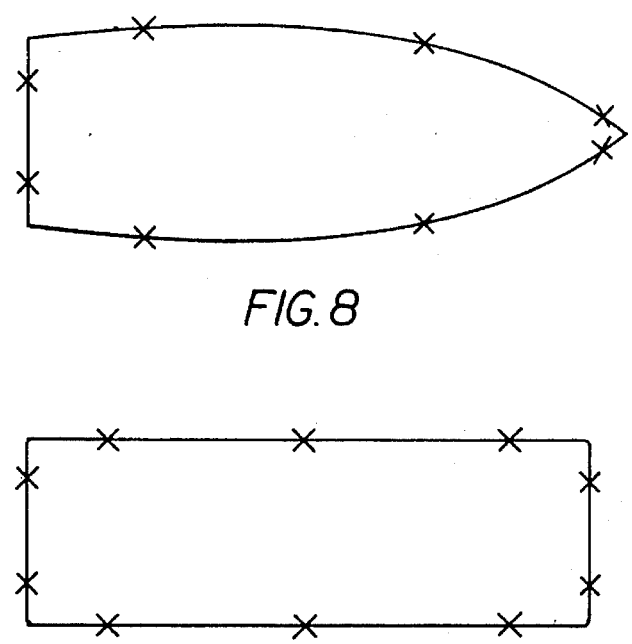
FIG. 8
FIG. 7

PORTABLE ADJUSTABLE TRANSDUCER AND DEPTH-FINDER HOLDER

BACKGROUND OF THE INVENTION

In general, mounting devices for boat sonar transducers fall into one of two categories: the devices either attach directly to the transom of the boat or hook over the upper ledge of the transom.

The first type of holder, as found in U.S. Pat. Nos. 3,714,619, issued to Morgan et. al., and 3,729,162, issued to Salvato, requires the mounting bracket to be either bolted or screwed to the transom. Such a transducer holder, however, has two distinct disadvantages. First, it necessitates the drilling of holes directly into the boat. And secondly, the holder is not easily removable which makes it both difficult to adjust and non-transportable.

The second type of holder provides for a more flexible means of supporting a transducer. One such device, as described in U.S. Pat. No. 3,989,213, issued to Allen, consists of a top portion which hooks over the upper ledge of the transom and is attached to a mounting post, the opposite end of which is a clamp that holds the transducer in depth-sensing position. The entire mounting device can be easily removed from the boat by pulling up on the attached handle.

Another such device, as shown in U.S. Pat. No. 3,752,431, issued to McBride, also has a bracket at the top which hooks over the upper ledge of the transom and a bracket at the bottom to which the transducer is bolted and held below the water line. This type of holder also has a crank arm to adjust the depth of the transducer.

Still another such device is set forth in the Blomberg U.S. Pat. No. 5,016,225. Again, the holder consists of an elongated base with an upper portion that hooks directly over the transom. This device also has a hollow cylindrical conduit that receives and protects the transducer lead, with the transducer being riveted to the base of the conduit. The conduit is held against the elongated base by thumb screws attached to mounting blocks; this arrangement also allows the entire conduit to be vertically moved to adjust the depth of the transducer.

This second category of transducer holder offers several advantages over the first type. The latter type does not require the drilling of holes into the boat hull, preventing permanent damage and making such a device more easy to install and remove. In addition, at least two of the second type are designed to be vertically adjustable, a task accomplished with the former type of holder only by removing the entire device and drilling new holes.

But even though the second category of transducer holder solves some of the problems associated with the first type, it does not fulfill all of the needs of the typical boater. All of the devices mentioned so far in general only set forth a means for holding the sonar transducer below the water line. A complete embodiment of a transducer holder should not only perform the function of holding the transducer but should also provide a means for supporting the depth-finder itself. Such a device would thus keep the depth-finder and transducer in one convenient location on a boat.

SUMMARY OF THE INVENTION

This invention relates to a portable and adjustable means for holding a measuring device and its display unit, and more particularly an apparatus for supporting a boat sonar transducer and its depth-finding display unit, within one embodiment.

Presently sonar transducers are either mounted directly onto a boat hull or attached to a holder which is then hooked over the boat transom. The depth-finder itself, however, is usually left either free-standing somewhere within the boat or is bolted to the floor of the boat. With a free-standing depth-finder the chances are great that the device will be knocked about and possibly damaged from the movement of the boat or even stolen while the boat is in storage. On the other hand, a bolted-down depth-finding device will cause permanent damage to the boat and is not easily removable nor transportable.

This present invention provides a sturdy means for both holding a sonar transducer or other measuring device below the water level and supporting the depth-finder or other display unit within the boat in a readily accessible position. The measuring device holder consists of a tube through which the measuring device lead passes. The bottom of the tube is indented and flattened to receive the measuring device bracket to which the measuring device is attached via mounting screws. The tube hooks onto the upper ledge of the transom of the boat by means of a tube block consisting of a tightening screw on one side and a boat clamp with a tightening screw on the other. The inner space of the boat clamp may be lined with foam or some other cushion to prevent the holder from bumping against the boat and to mold the clamp to the contour of the boat. At the top of the tube is another tube block with a tightening screw into which the base of the depth-finder holder fits. This tube block arrangement allows the attached display unit holder to be rotated 360° and/or locked into a rigid position.

The display unit holder itself consists of a box with one open side into which the depth finder is placed. The base of the box has an opening for battery leads to pass through. Beneath the box are attached extra support inserts.

This invention encompasses a sonar transducer or other measuring device holder and depth-finder or other display unit holder which is contained within one embodiment.

Therefore it is an object of this invention to provide a means for supporting both a display unit and its measuring device so that the devices can be placed in one convenient location within a boat.

It is another object of this invention to provide for a measuring device and display unit holder which will not cause permanent damage to a boat and can be easily adjusted and/or removed.

It is still another object of this invention to provide for a sturdy measuring device and display unit holder that can withstand boat speeds in excess of 35 mph.

BRIEF DESCRIPTION OF THE DRAWINGS

The above and other objects, features and advantages of the invention will become more readily apparent from the following with reference to the accompanying drawings in which:

FIG. 4 is a perspective view of the depth-finder holder atop the tube of the transducer holder, incorporating all of the features of this invention.

FIG. 5 is a side view of the depth-finder holder as it is attached to the tube of the transducer holder.

FIG. 6 shows the transducer and depth-finder holder as it is attached to the back of a boat, while FIGS. 7 and 8 depict various types of boats and where the transducer and depth-finder holder may potentially be attached to the boats, as designated by "X's".

DETAILED DESCRIPTION OF THE DRAWINGS

Figure 1:
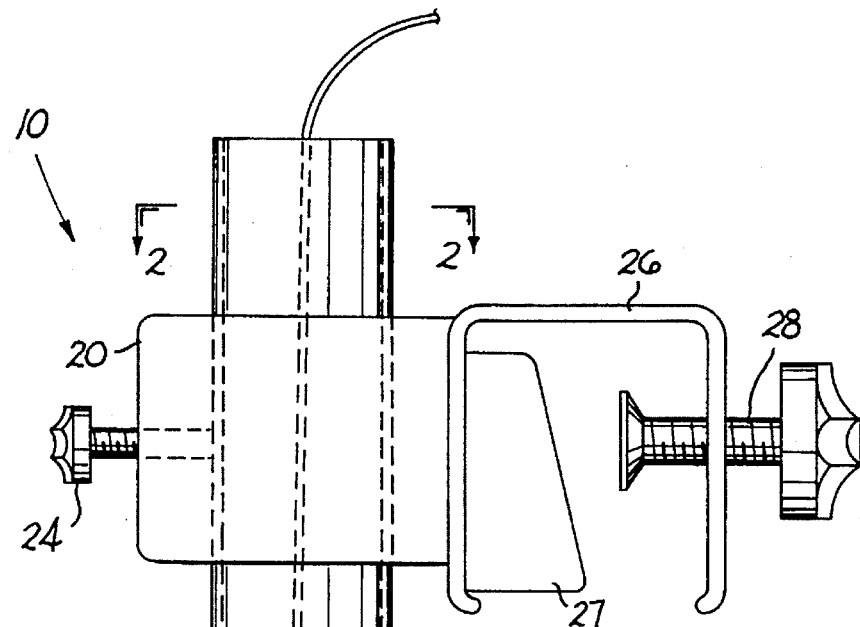
FIG. 1 is a side perspective view of a transducer holder incorporating the features of this invention.

Referring now to FIG. 1, there is shown the transducer holder 10 in a side view. It is comprised of a tube 11 made of resilient plastic or a similar material which is indented and flattened at its bottom at 11a. At the indented portion 11a, the transducer 13 is bolted to the transducer bracket 15. The transducer bracket 15 is in turn attached to the indented portion 11a with mounting screws 17 and 18. The tube block 20 has a cylindrical opening 22 through which the tube 11 fits. A screw 24 is located on one side of the tube block 20 to allow the tube 11 to be moved vertically within the tube block 20 and then locked rigidly into position. On the opposite side of the tube block 20 is a U-shaped clamp 26 with an attached screw 28 which can be placed over the upper ledge of a boat transom and locked firmly into place. The inside of the U-shaped clamp 26 may be lined with foam or the like 27 to provide for a cushion against the boat as well as a space adapter for different sizes of boats. The transducer lead 30 passes through the top of and is protected by the tube 11 and attaches to the transducer 13 at the opposite end.

Figure 2:
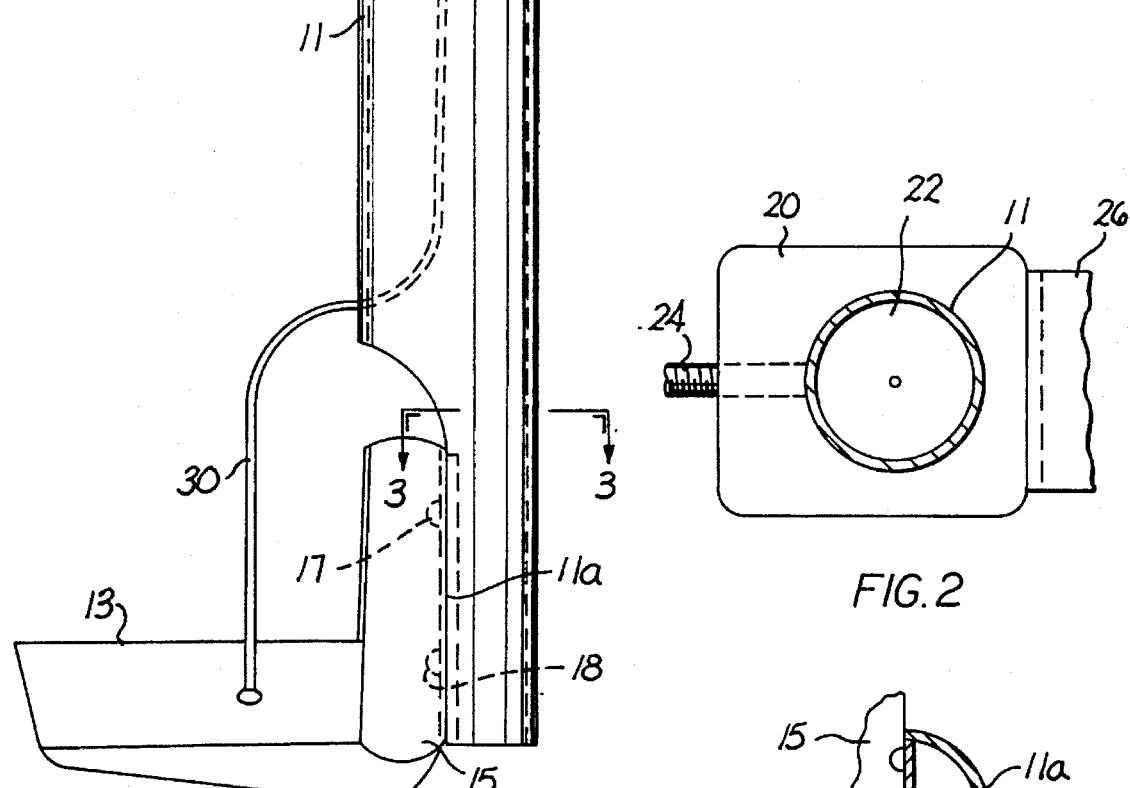
FIG. 2 is a top perspective of a tube block and an attached tightening screw, showing the cylindrical opening of the tube block.

FIG. 2 is a detailed view of the tube block 20, showing the cylindrical opening 22 through which the tube 11 fits and the screw 24 which is used to lock the tube into position.

Figure 3:
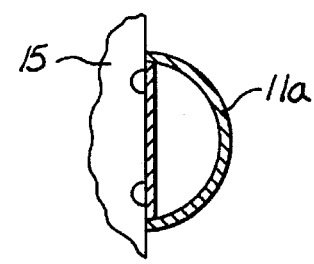
FIG. 3 is a cross sectional view through the bottom of the tube at a point where it is indented and flattened.

FIG. 3 is a cross sectional view of the indented and flattened area 11a of the tube 11. This configuration can be achieved by heating and molding one end of a tube 11.

FIG. 4 is a front view of the depth-finder holder 32 sitting atop the tube 11 of the transducer holder 10. The depth-finder holder 32 itself consists of a box with one open side into which the depth-finder 33 is placed. The depth-finder holder 32 is designed to support and protect the depth-finder 33. The base of the depth-finder holder 32 may have at least one opening 35 for battery leads to pass through. A second tube block 34 with an attached screw 36 is positioned below the depth-finder holder 32 and allows for the depth-finder holder to attach to the top of the tube 11. The screw 36 enables the depth-finder holder 32 to be rotated 360° and/or locked into place. Extra support inserts 38 and 39 are attached to the base of the depth-finder holder 32.

FIG. 5 is a side view of the depth-finder holder 32 as it is attached to the tube 11 of the transducer holder 10.

FIG. 6 shows the entire embodiment of the invention 40 as it is attached to the back of a boat B. In addition, "X's" in FIGS. 7 and 8 indicate possible points of attachment for the invention 40.

The invention, as designed, can withstand boat speeds of up to 35 mph.

This represents only one embodiment of the invention. It is understood that this invention could be used to house other boating equipment such as a temperature gauge and its display unit without departing from the scope of the claims of this invention.

What is claimed is:

1. An apparatus for holding a measuring device and display unit, comprising:

a hollow tubular member having an indented flat portion at one end of said hollow tubular member for attachment of a measuring device and an open portion at another end of said hollow tubular member;

a block means having an opening therein receiving said hollow tubular member therein;

an adjustment means on said block means for adjusting the position of said hollow tubular member within said block means;

a clamp means attached to said block means for clamping said hollow tubular member to a boat; and a means adjustably mounted to said open portion of said hollow tubular member for supporting a display unit whereby said apparatus permits communication between said measuring device and said display unit.

2. An apparatus for holding a measuring device and display unit as recited in claim 1, wherein said hollow member is a tube made of strong plastic.

3. An apparatus for holding a measuring device and display unit as recited in claim 1, wherein said clamp means is an inverted U-shaped clamp and is rigidly attached to said block means, and a threaded adjustment means, for attaching said clamp to a boat.

4. An apparatus for holding a measuring device and display unit as recited in claim 1, comprising further a spacer means mounted on an inner side of said clamp means for cushioning said clamp means against a boat and spatially adapting said clamp means to conform to the contour of the boat.

5. An apparatus for holding a measuring device and display unit as recited in claim 1, wherein said adjustment means on said block means is a threaded shaft which allows for vertical positioning of said hollow member within said block means.

6. An apparatus for holding a measuring device and display unit as recited in claim 1, wherein said means for supporting a display unit is an open box and has a plurality of insert supports attached to a bottom of said box.

7. An apparatus for holding a measuring device and display unit as recited in claim 6, comprising further a threaded adjustment means attached to said box for rotating and locking said box into position.

8. An apparatus for holding a measuring device and display unit as recited in claim 6, wherein said box has at least one aperture in said bottom of said box.

9. An apparatus for holding a measuring device and display unit, comprising:

hollow tubular means having an indented flat portion at a peripheral sector thereof for attachment of a measuring member and an open portion at a spaced sector thereof;

means having an opening therethrough for receiving said hollow tubular means therein;

adjustment means on said receiving means for adjusting the position of said hollow tubular means within said receiving means; and means adjustably mounted to said open portion of said hollow tubular member for supporting a display unit whereby said apparatus permits communication between said measuring device and said display unit.

10. An apparatus for holding a measuring device and display unit, comprising:

a hollow tubular member having an indented flat portion at one end of said hollow tubular member for attachment of a measuring device and an open portion at another end of said hollow tubular member;

a block means having an opening therein for receiving said hollow tubular member therein;

a clamp means attached to said block means for clamping said hollow tubular member to an object; and a means mounted to said open portion of said hollow tubular member for supporting a display unit whereby said apparatus permits communication between said measuring device and display unit.

11. An apparatus for holding a measuring device and display unit as recited in claim 10, further comprising adjustment means on said block means whereby the vertical position of said hollow member can be adjusted within said block means.

12. An apparatus for holding a measuring device and display unit as recited in claim 10, further comprising adjustment means on said means for supporting said display unit whereby said means for supporting said display unit can be rotated through an angle of 360° and locked into any position therealong.

\* \* \* \* \*